(12) United States Patent
Takatori et al.

(10) Patent No.: US 6,659,912 B2
(45) Date of Patent: Dec. 9, 2003

(54) SHIFT CONTROL SYSTEM FOR AUTOMATIC TRANSMISSION

(75) Inventors: Kazuhiro Takatori, Fuji (JP); Osamu Sato, Fuji (JP); Yasushi Fujita, Fuji (JP); Tatsuya Imamura, Fuji (JP)

(73) Assignee: Jatco Transtechnology Ltd. (JP)

( * ) Notice: Subject to any disclaimer, the term of this patent is extended or adjusted under 35 U.S.C. 154(b) by 22 days.

(21) Appl. No.: 10/040,302

(22) Filed: Jan. 3, 2002

(65) Prior Publication Data

US 2002/0107110 A1 Aug. 8, 2002

(30) Foreign Application Priority Data

Jan. 11, 2001 (JP) ........................................ 2001-003454

(51) Int. Cl.⁷ ............................................... F16H 61/06
(52) U.S. Cl. ............................. 477/117; 477/97; 477/98
(58) Field of Search ............................. 477/69, 97, 98, 477/115, 116, 117

(56) References Cited

U.S. PATENT DOCUMENTS

| | | | | |
|---|---|---|---|---|
| 4,529,072 A | * | 7/1985 | Oguma et al. | 477/87 |
| 4,841,813 A | * | 6/1989 | Fujiwara et al. | 477/155 |
| 6,030,313 A | * | 2/2000 | Sawada et al. | 477/46 |
| 6,371,886 B1 | * | 4/2002 | Sawa et al. | 477/115 |
| 6,394,926 B1 | * | 5/2002 | Jang | 475/116 |

FOREIGN PATENT DOCUMENTS

| | | | |
|---|---|---|---|
| JP | 409152024 | * | 6/1997 |
| JP | 2000088089 | * | 3/2000 |

* cited by examiner

Primary Examiner—Ha Ho
(74) Attorney, Agent, or Firm—Rossi & Associates

(57) ABSTRACT

When a transmission selector lever is operated from P or N range to D range, an input clutch to be engaged at the fifth gear position is temporally engaged to reduce shift shock when the engaging element for the first gear position is engaged. An oil pressure command value for actuating the input clutch is increased with a constant inclination from a start point oil pressure value, and the start point oil pressure value is lowered when the engine speed is low or when an oil temperature is high. Even if a timing of completion of filling of working fluid to the input clutch is fluctuated, the difference between the actual oil pressure and the oil pressure command value is suppressed to a small level and the occurrence of shock due to surge at the time of the filling completion is prevented.

13 Claims, 8 Drawing Sheets

Fig.2

|  | Fr/B | 3rd/OWC | I/C | H&LR/C | 1st/OWC | D/C | R/B | LC/B | Fwd/B | F/OWC |
|---|---|---|---|---|---|---|---|---|---|---|
| P | ● |  |  | ● |  |  |  |  |  |  |
| N | ● |  |  | ● |  |  |  |  |  |  |
| Forward 1st | ● | △ | * | (O)· | △ |  |  | (O) | O | △ |
| Forward 2nd | (O) | △ |  |  |  |  |  | (O) | O | △ |
| Forward 3rd | (O) | △ | O | O | □ | O |  |  | ● |  |
| Forward 4th | O |  | O | O | □ | O |  |  | ● |  |
| Forward 5th | O | □ |  | O | □ |  |  |  | ● |  |
| Rev. | O | △ |  | O | △ |  | O |  |  |  |

O : Engaged
△ : Transmit Torque during Power-ON only
□ : Transmit Torque during Coast only
● : Supplied with Oil Pressure but No Transmission
(O) : Engaged in Over Run Mode
(O)· : Engaged upon Select, thereafter disengaged except in Over Run Mode
* : Engaged at Initial stage of shift only

SHIFT CONTROL SYSTEM FOR AUTOMATIC TRANSMISSION

BACKGROUND OF THE INVENTION

1. Field of the Invention

The present invention relates to a shift control system of an automatic transmission for a vehicle.

2. Description of the Prior Art

In an automatic transmission for a vehicle, the combination of a planetary gear mechanism and a plurality of engaging elements such as clutch, brake or the like which are actuated by oil pressure and the combination of engagement and disengagement of the engaging elements achieve a plurality of gear positions which respectively provide predetermined gear ratios. In case of performing shift operations between each gear, a working fluid pressure applied to the engaging elements is controlled so as to suppress shift shock at the time of engaging the engaging elements. Here, a gear ratio is represented by a ratio between an input speed and output speed of the automatic transmission Moreover, for the driver to operate the automatic transmission, in addition to P (parking) range and N (neutral) range, as running range, there is provided "1" range or "2" range, within which a gear position is limited to the first gear or up to the second gear position, as well as D (drive) range, within which a shift operation is performed in order from the first gear position to the highest speed gear position according to driving condition. Using a selector lever, these ranges can be selected in accordance with running environments.

When the selector lever is shifted from P range or N range to D range for a starting while the vehicle is stopped, the automatic transmission engages and disengages predetermined engaging elements to establish the first gear position in response to this operation of the selector lever.

Here, since a gear ratio in the first gear position is large compared with gear positions of high speed side and a high torque is applied to an engaging element to be engaged, a working fluid pressure supplied to actuate the engaging element is set to a relatively high level.

As a result, at the time of shifting to the first gear position which is automatically determined during a shift to D range from N (neutral) range, strong shift shock may occur when the engaging element is engaged although the working fluid pressure is supplied under control.

In order to reduce the shock occurring during a shift to D range from P range or N range, for example, in an automatic transmission disclosed in Japanese Patent Application Laid-open No. 9-152024, the highest speed gear position, such as a third gear position, is temporally set at the same time as the start of preparation for a shift to the first gear position.

More specifically, by engaging an engaging element for the third gear position, to which a low torque is applied, the anxiety about shift shock caused thereby is eliminated, and simultaneously by reducing difference between this low torque and a torque applied to an engaging element to be engaged at the first gear position, shift shock at the time of shifting to the first gear position is relieved.

The engaging element is provided with friction elements on a driving side and a driven side and engages or disengages these friction elements according to the supplied oil pressure. However, even if a shift command is given to start the supply of oil pressure to the engaging element, the friction elements do not start to engage at once. An actual engagement of these friction elements is not started until an oil pressure chamber of the engaging element is filled with working fluid. This requires passing through a standby phase until a gear ratio starts to change.

In this standby phase, generally as shown in FIG. 8A, a shift command is given to temporally increase an oil pressure command value to a high level at the time t0 and then to drop this oil pressure command value to a predetermined lower level at the time t1 and thereafter to increase the oil pressure command value till the time t3 at which a gear ratio starts to change.

On the other hand, during this period, an actual value of oil pressure indicated by a broken line changes at a lower level than the oil pressure command value. At the time t2 at which the filling of the working fluid into the oil pressure chamber is completed, there occurs a surge S in the actual oil pressure, and this actual oil pressure rises to the vicinity of the oil pressure command value. In case the filling of the working fluid into the oil pressure chamber is completed while the oil pressure command value is relatively low, shock due to this surge does not exert much influence.

However, if the third gear position as the high speed gear position is temporally set when a shift operation to D range from P range or N range is performed, it becomes necessary to supply oil pressure to an engaging element to be engaged at the third gear position in addition to an engaging element to be essentially engaged at the first gear position. This makes it difficult to supply an oil of sufficient amount, and engagement of the engaging element itself for a high speed gear position may require a long time.

Thus, as shown in FIG. 8B, if the filling of the working fluid into the oil pressure chamber delays to the time t4, the oil pressure command value increases all the while, and thereby a surge S as occurs at the time of completion of filling of the working fluid increases to a level to generate shift shock.

Such a tendency is noticeable especially in the case the engine rotates at a low speed and output of an oil pump is low or in the case oil temperature is high and there is a large amount of leakage from a oil pressure supplying passage. A great shock is generated in engagement of the engaging element for a high speed gear position which is performed to relieve shift shock, and the intended object cannot be achieved.

In order to solve such a problem, it is considered to change an inclination of rise of the oil pressure command value with oil temperature. If this inclination is changed, however, a degree of change of deviation (difference) between the oil pressure command value and the actual value grows depending on times (for example, t5, t6) when the filling of the working fluid is completed. For this reason, a severe shock may occur.

On the other hand, if the oil pressure command value is always set to a low level so that deviation (difference) between the oil pressure command value and the actual value is kept small without reference to when the filling of the working fluid is completed, shift time may be elongated and the engagement of an engaging element for a high speed gear position may not be established before a shift operation to the first gear position.

SUMMARY OF THE INVENTION

The present invention has been made in view of the aforementioned problem, and it is an object to provide a shift control system capable of surely preventing the occurrence of shock in an automatic transmission wherein an engaging element for a high speed gear position is temporarily engaged when a shift operation to D range from P range or N range is performed.

In the first aspect of the present invention, therefore, a shift control system for an automatic transmission which has select position detecting means for detecting a select position of a selector lever and switches a plurality of gear positions including a first gear position when the selector lever is positioned at a running range, comprises control means for temporally engaging an engaging element to be engaged at a gear position of higher speed side than the first gear position when the select position detecting means detects that the selector lever is operated from a parking or neutral range to the running range, and the control means increases an oil pressure command value for actuating the engaging element from a start point oil pressure value after a precharge pressure with a predetermined inclination, while changing the start point oil pressure value in accordance with driving environments.

According to the above described construction, even if timing of completion of filling of the working fluid to the engaging element is fluctuated depending on the driving environments, a difference between an actual value of oil pressure and an oil pressure command value is suppressed to a small level, and the occurrence of shock due to a surge at the time of completion of the filling is prevented. Especially, since an inclination of increase of the oil pressure command value is constant, the difference between the actual value of oil pressure and the oil pressure command value is prevented from widening.

In the second aspect of the invention, the shift control system further comprises engine speed detecting means for detecting a revolution speed of an engine, and the control means lowers the start point oil pressure value when the engine speed is low.

Even if the output of an oil pump is low and the timing of completion of filling of the working fluid is delayed, the difference between the actual value and the oil pressure command value does not widen.

In the third aspect of the invention, the shift control system further comprises oil temperature detecting means for detecting an oil temperature of the engaging element, and the control means lowers the start point oil pressure value as the oil temperature increases.

Even if the timing of completion of filling of the working fluid is delayed due to the leakage of the working fluid, the difference between the actual value and the oil pressure command value does not widen.

In the forth aspect of the invention, the control means lowers the oil-pressure-command value immediately after the engaging element is engaged. By this, shifting to the first gear position can be promptly accomplished, realizing an excellent shift response.

In the fifth aspect of the invention, the shift control system further comprises turbine speed detecting means connected to a torque converter and detecting a turbine revolution speed of the torque converter, and the control means determines that the engaging element is engaged when the turbine revolution speed is lower than a predetermined value. Thereby, the aforementioned engagement state can be easily determined.

In the sixth aspect of the invention, the highest gear position is set as the gear position of higher speed side.

Since the highest gear position in which torque applied to the engaging element is especially low is set as the gear position of higher speed side, shock due to a surge can be easily suppressed.

In the seventh aspect of the invention, the shift control system further comprises throttle valve opening detecting means for detecting an opening degree of a throttle valve of the engine, and the control means terminates a control to engage the engaging element to be engaged at the higher speed side gear position when the throttle valve opening is larger than a predetermined value.

When the driver intends to rapidly accelerate by depressing an accelerator pedal, the first gear position can be promptly accomplished without passing the gear position of high speed side.

The above and further objects and features of the invention will be more fully apparent from the following description when the same is considered with reference to the accompanying drawings.

BRIEF DESCRIPTION OF THE DRAWINGS

FIG. 2 is a chart showing combinations of engagement and disengagement of engaging elements in the transmission mechanism;

DETAILED DESCRIPTION OF THE PREFERRED EMBODIMENT

Here will be described the embodiment of the invention with reference to the accompanying drawings.

Figure 1:
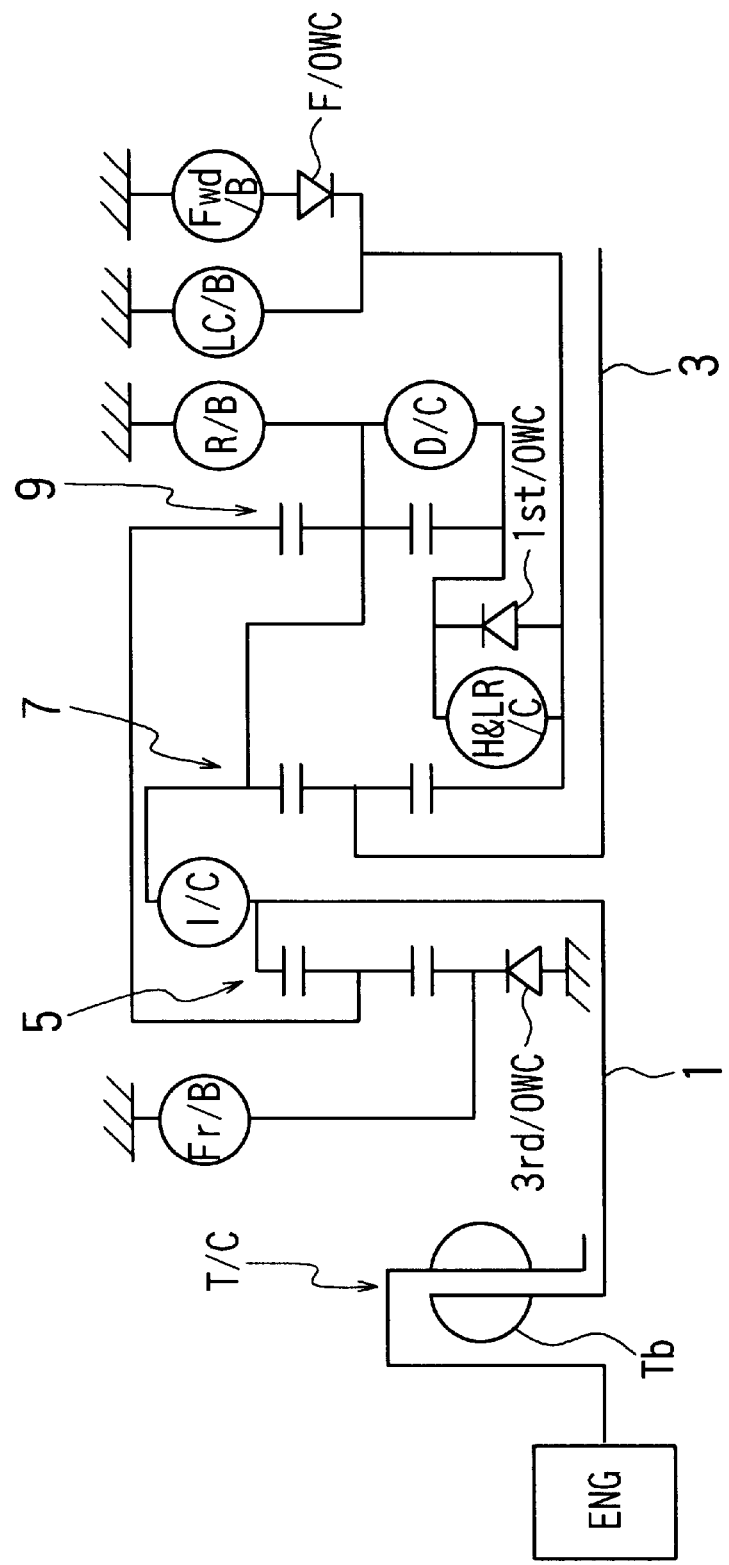
FIG. 1 is a diagram showing a transmission mechanism of an automatic transmission to which the present invention is applied.

FIG. 1 shows a transmission mechanism of an automatic transmission according to the embodiment, and FIG. 2 shows combinations of engagement and disengagement of engaging elements in the transmission mechanism.

This transmission mechanism is provided with an input clutch I/C, a high and low reverse clutch H&LR/C, a direct clutch D/C, a forward one-way clutch F/OWC, a first one-way clutch 1st/OWC, a third one-way clutch 3rd/OWC, a front brake Fr/B, a forward brake Fwd/B, a reverse brake R/B and a low-coast brake LC/B as engaging elements adapted to three sets of planetary gear mechanisms 5, 7 and 9 disposed between an input shaft 1 and an output shaft 3.

The automatic transmission is connected to an engine via a torque converter T/C. The input-shat 1 is connected to a turbine Tb of the torque converter.

This transmission mechanism is identical to that disclosed in Japanese Patent Laid-open No. 2000-88089, for example.

In this transmission mechanism, the five forward gear positions from the first gear position to the fifth gear position are obtained in D range as a running range by combinations of engagement and disengagement as shown in FIG. 2. Here, the description about "1" range and "2" range is omitted. The circles indicate "engagement" respectively in FIG. 2.

In the first gear position, as shown in FIG. 2, at least the forward brake Fwd/B is engaged, and the input clutch I/C is disengaged. On the other hand, in the fifth gear position of the high speed gear, the input clutch I/C is engaged.

According to this embodiment, the input clutch I/C is temporally engaged in the initial phase of shifting to D range from P range or N range, as in the case of the fifth gear position. In FIG. 2, a "*" mark in the first gear position indicates this engagement.

An electronic control unit (ECU) 10 receives signals from a an engine speed sensor 12, a throttle sensor 13 for detecting an opening degree of a throttle valve of the engine, a turbine speed sensor 14 for detecting turbine revolution speed of the torque converter, a vehicle speed sensor 15, a temperature sensor 16 for detecting a working fluid temperature (hereinafter referred to as oil temperature), and an inhibitor switch 17 attached to a selector lever. The vehicle speed sensor 15 detects a revolution speed of an output shaft of the automatic transmission. The vehicle speed is obtained by multiplying the revolution speed by a predetermined coefficient. And a gear ratio is obtained as a ratio between a vehicle speed and a turbine revolution speed.

The electronic control unit 1 continuously receives signals from respective sensors and uses information of ever-changing engine speed, throttle valve opening, turbine revolution speed, output shaft revolution speed, oil temperature or the like for an after-mentioned control of the input clutch I/C.

Figure 3:
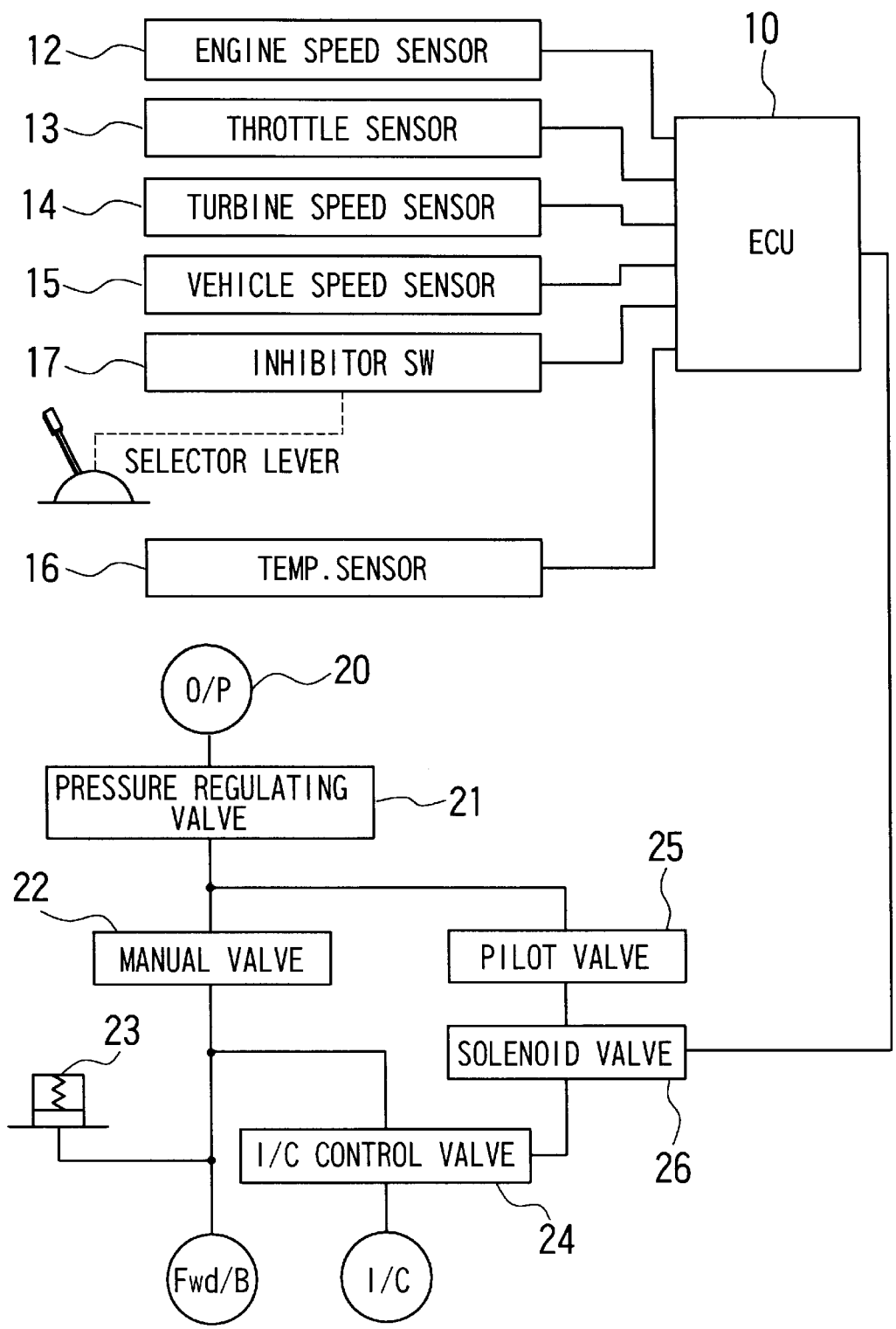
FIG. 3 is a diagram showing an oil pressure circuit and a control signal system.

FIG. 3 shows an oil pressure circuit and a control signal system of the forward brake Fwd/B and the input clutch I/C which is operated at the time of a shift to D range.

The forward brake Fwd/B is provided with an oil pressure, which is regulated by a pressure regulating valve 21 receiving output from an oil pump 20, via a manual valve 22. Between the manual valve 22 and the forward brake Fwd/B, there is arranged an accumulator 23 which controls the supply of the oil pressure to the forward brake Fwd/B.

Moreover, the manual valve 22 is connected to the input clutch I/C via an I/C control valve 24, and the I/C control valve 24 is provided with an oil pressure from the pressure regulating valve 21. The I/C control valve 24 is actuated by an oil pressure from a solenoid valve 26. The solenoid valve 26 controls the oil pressure from the pressure regulating valve 21 via a pilot valve 25, and outputs the controlled pressure to the I/C control valve 24.

Here will be described a control of an oil pressure command value, which is applied to the input clutch I/C for the fifth gear position, by the electronic control unit 10.

The electronic control unit 10 generates the oil pressure command value and outputs a current corresponding to the oil pressure command value as a control signal to the solenoid valve 26.

Figure 4:
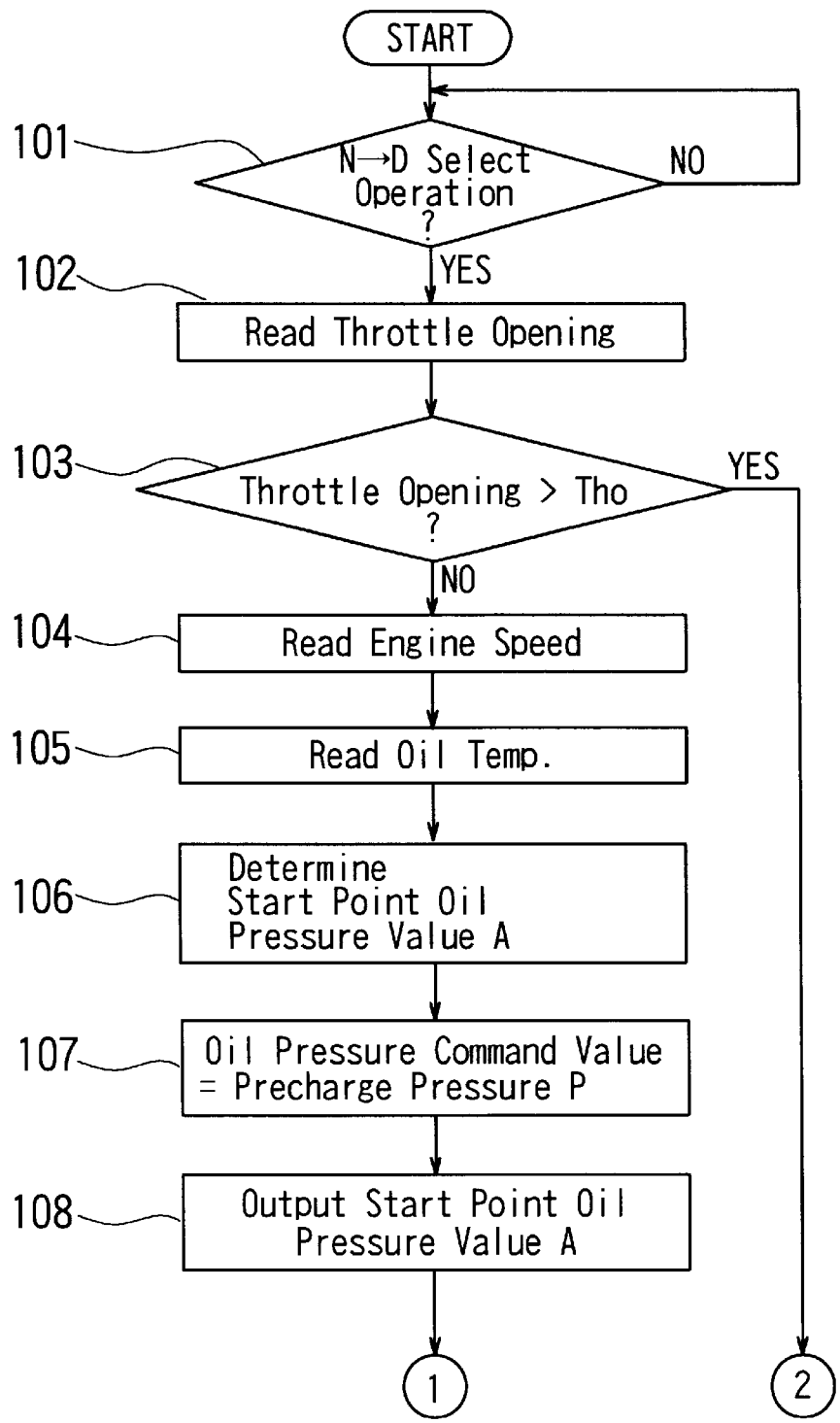
FIGS. 4 and 5 are flow charts showing a control flow of oil pressure command values.
Figure 5:
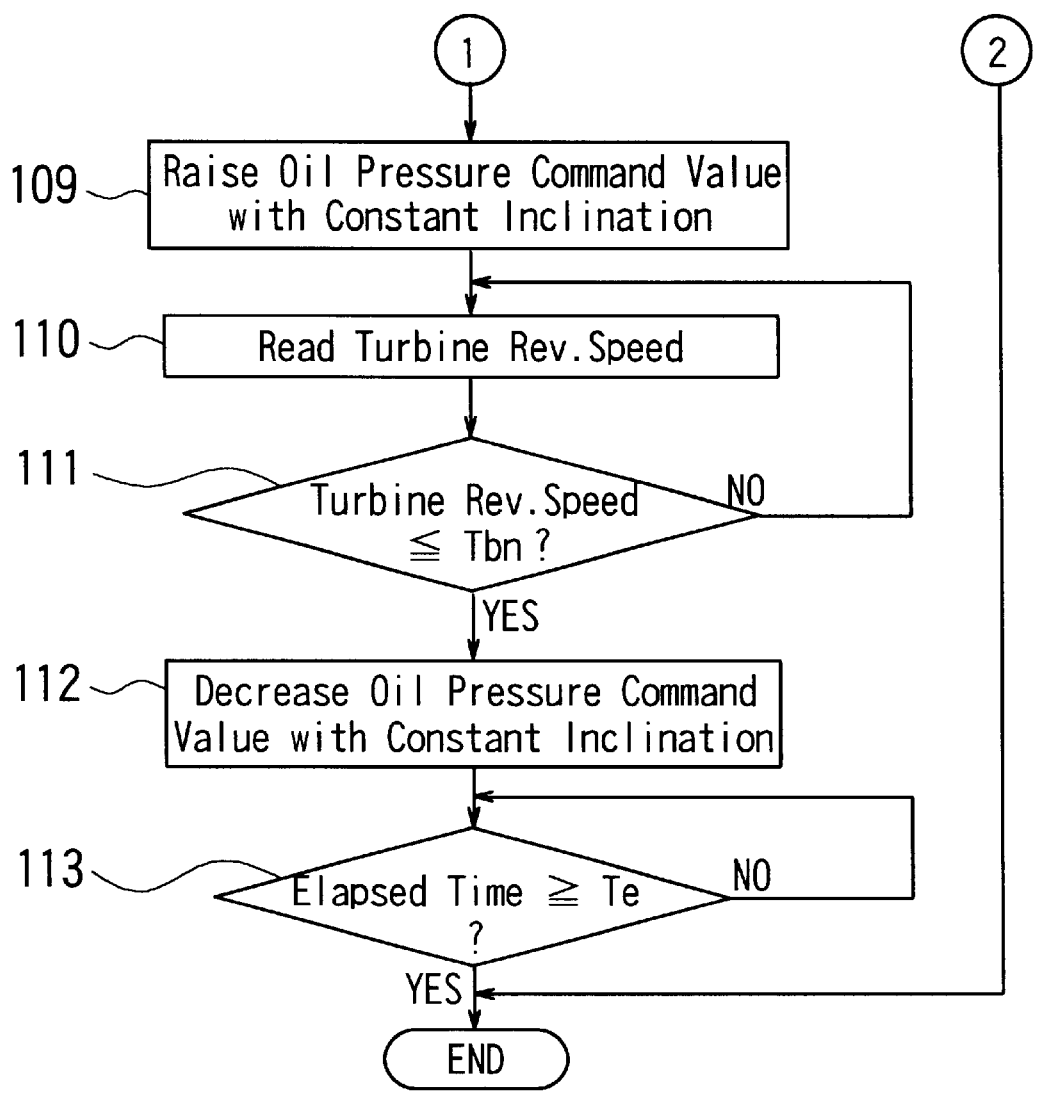
Figure 6A:
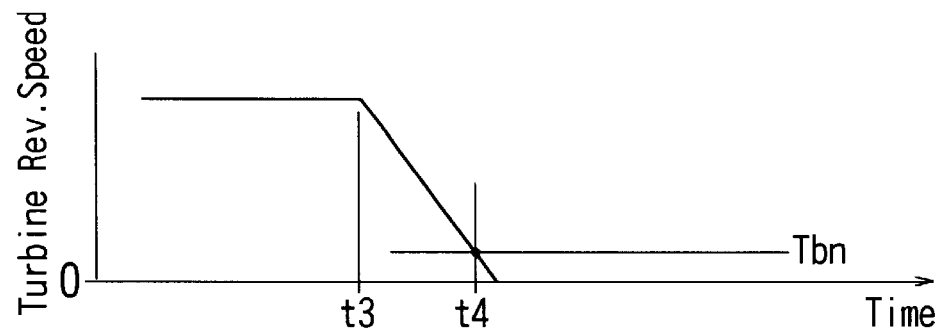
FIG. 6A is a diagram showing a change of turbine revolution speed.
Figure 6B:
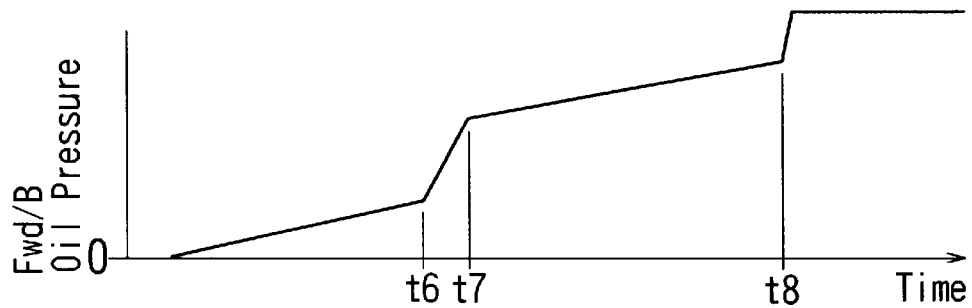
FIG. 6B is a diagram showing a change of oil pressure in a forward brake.
Figure 6C:
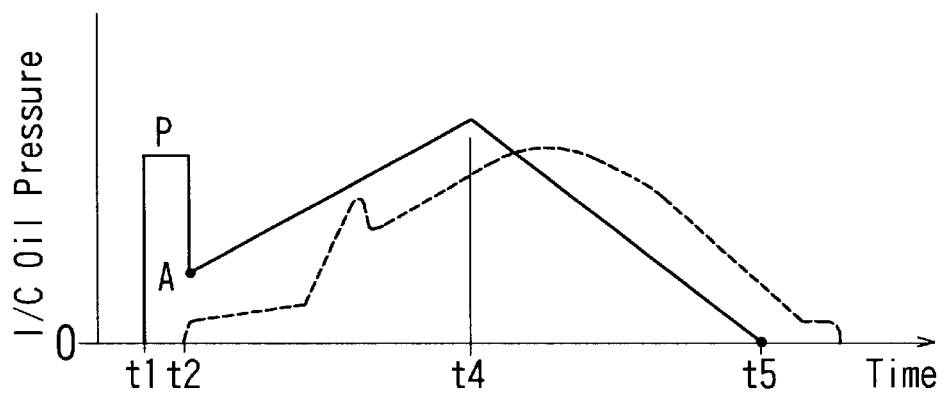
FIG. 6C is a diagram showing a change of oil pressure command value.

FIGS. 4 and 5 are flow charts showing a control flow of the oil pressure command values by the electronic control unit 10 in the case the selector lever is moved from N range to D range when the engine is rotating. FIGS. 6A to 6C are diagrams showing changes in a turbine revolution speed, oil pressure in the forward brake, and an oil pressure command value.

First in a Step 101, it is checked whether a shift operation to D range from N range is performed based on a signal from the inhibitor switch 17.

If a select operation to D range is detected, a throttle valve opening (throttle opening) is read in a Step 102. Then, in a Step 103, it is checked whether the throttle valve opening is larger than a predetermined value THO.

When the throttle valve opening is larger than the predetermined value, it is determined that the accelerator pedal is depressed, and this control is terminated. Thereby, in case the driver has an intention to accelerate, a shift to the first gear position is immediately accomplished, and a rapid acceleration becomes possible. In this case, since the accumulator 23 absorbs fluctuation of oil pressure, shift shock is suppressed to such a level as to provide no sense of physical discomfort even under the rapid acceleration.

When the throttle valve opening is equal to or smaller than a predetermined value, the routine advances to a Step 104.

While an engine speed is read in the Step 104, an oil temperature is read in a Step 105. In a Step 106, then, on the basis of the engine speed and oil temperature, a start point oil pressure value A is determined from a preset map.

Figure 7:
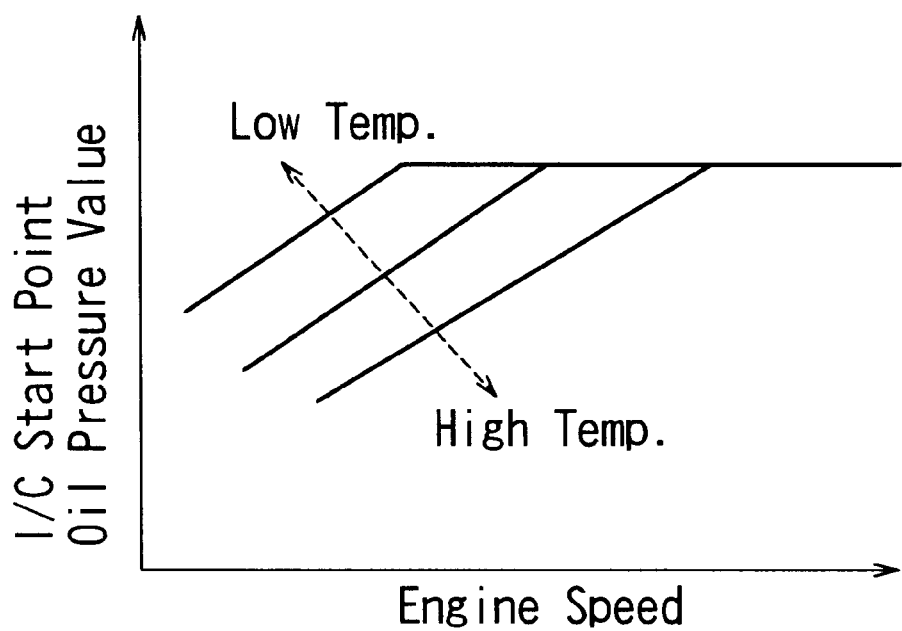
FIG. 7 is a map for determining a start point oil pressure value.
Figure 8A:
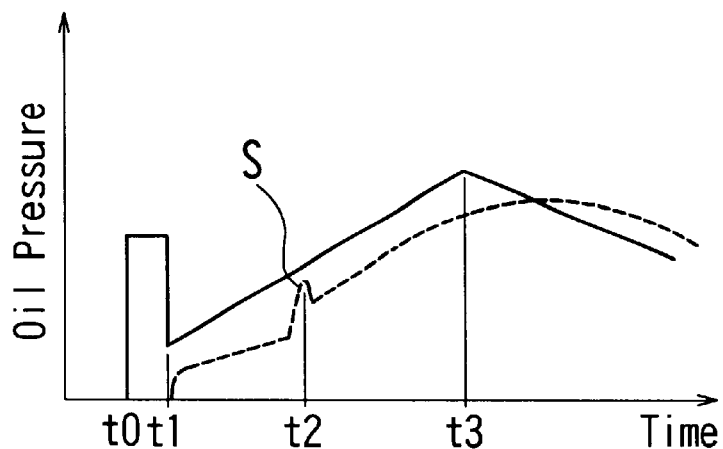
FIGS. 8A to 8C are schematic diagrams showing problem with a conventional control system.
Figure 8B:
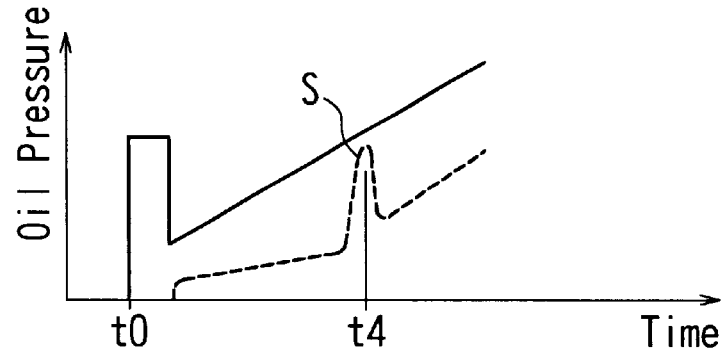
Figure 8C:
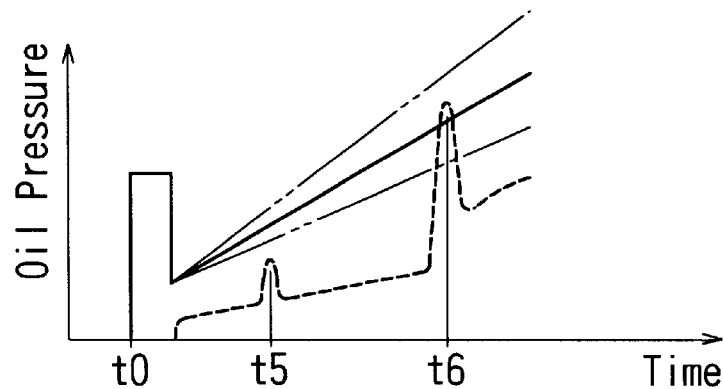

FIG. 7 shows a map for determining the start point oil pressure value A.

The start point oil pressure value A is constant if the engine speed is higher than a predetermined value. On the other hand, if the engine speed is lower than the predetermined value, lower the engine speed, the smaller the start point oil pressure value A becomes.

Moreover, the higher the oil temperature, the smaller the start point oil pressure value A becomes. As described above, the higher the oil temperature, the more the leakage in the oil pressure supply passage from the oil pump 20 to the input-clutch I/C increases. For this reason, by making the aforementioned setting, even if completion of filling of the working fluid delays, a difference between an oil pressure command value and an actual value is prevented from increasing.

In a Step 107, a precharge pressure P which is preset only for a predetermined time period is set as an oil pressure command value for the input clutch I/C.

After the predetermined time period elapsed, in a Step 108, the start point oil pressure value A which is set in the forgoing Step 106 is set as the oil pressure command value.

Thereby, as shown in FIG. 6C, an oil pressure command value which is set at a precharge pressure P at the time t1 is dropped to a start point pressure value A at the time t2.

In a Step 109, an oil pressure command value for the input-clutch I/C is increased with a predetermined constant inclination from the start point oil pressure value A.

In a Step 110, a turbine revolution speed is read, and then, in a Step 111, it is checked whether the turbine revolution speed is equal to or lower than a predetermined value Tbn.

Until the turbine revolution speed becomes equal to or lower than the predetermined value Tbn, the Step 110 and the Step 111 are repeated.

If the turbine revolution speed is equal to or lower than the predetermined value Tbn at the time t4 in FIG. 6A, it is determined that engagement of the input clutch I/C is completed. Then, in a Step 112, the oil pressure command value is decreased with a predetermined constant inclination as shown in FIG. 6C.

In a Step 113, it is checked whether an elapsed time from a time t4 reaches a predetermined threshold Te. When this elapsed time reaches the threshold Te, the control of the input clutch I/C is terminated at the time t5.

During this time, an actual value of the oil pressure in the input clutch I/C changes as indicated by a broken line in FIG. 6C.

Here will be described oil pressure to the forward brake Fwd/B which is an engaging element for the first gear position. When the selector lever is operated from N range to D range, a forward brake circuit of the manual valve 22 is first opened, and an oil pressure chamber of the forward brake Fwd/B is filled with the working fluid. As shown in FIG. 6B, the oil pressure changes at a low level during the filling, but after the filling is completed at the time t6, the oil pressure changes to a predetermined shelf pressure from the time t7 at which the accumulator 23 is actuated. During this time, the forward brake Fwd/B is engaged, and the oil pressure becomes the maximum pressure based on an oil pressure command value when the actuation of the accumulator 23 is finished at the time t8.

Thus, while the oil pressure applied to the forward brake Fwd/B is gradually increased, the input clutch I/C is first engaged. Thereafter, by decreasing the oil pressure of the input clutch I/C while the forward brake Fwd/B for the first gear position is transferred to an engaged state, the input clutch I/C is disengaged. When the engagement of the forward brake Fwd/B is completed, the input clutch I/C is disengaged, and the first gear position is completely achieved.

In this embodiment, the Step 101 corresponds to select position detecting means of the present invention, the Step 102 corresponds to throttle valve opening detecting means, the Step 104 corresponds to engine speed detecting means, the Step 105 corresponds to oil temperature detecting means, the Step 110 corresponds to turbine speed detecting means, and the Steps 103, 106 to 109 and 111 to 113 correspond to control means.

As stated above, in this embodiment, the input clutch for the fifth gear position is temporally engaged before the forward brake Fwd/B for the first gear position is engaged when a shift operation to D range from N range is performed. In this case, the lower the engine speed, the smaller value the start point oil pressure value A after precharge pressure in the oil pressure command value of the input-clutch I/C is set. Also, the higher the oil temperature, the smaller value this start point oil pressure value A is set. Since the oil pressure command value is increased with a constant inclination from this start point oil pressure value A, a difference between the actual value and the oil pressure command value is suppressed to a small level even if timing of completion of filling of the working fluid to the input-clutch I/C is fluctuated depending on environment conditions at the time of selection of D range. As a result, the occurrence of shock due to surge at the time of completion of filling of the working fluid can be prevented.

Moreover, since the inclination of increase of the oil pressure command value is constant, a difference between the actual value and the oil pressure command value is prevented from widening.

Since the working fluid is sufficiently supplied from the oil pump 20 when the engine speed is above a predetermined speed, there arises no problem of delay in completion of filling of the working fluid. Therefore, a control to lower the start point oil pressure value A is not performed. As a result, an unnecessary increase of a select lag (select response lag) which makes a response feeling worse is not caused.

Furthermore, since the lowering of the oil pressure command value is started immediately after the input clutch I/C is engaged and the turbine revolution speed is lowered to a predetermined value, the delay in accomplishment of the first gear position is avoided.

Although, in this embodiment, the elapsed time from the time when the turbine-speed is lower than a predetermined value is checked in the Step 113 of the flow chart, instead of this, whether an oil pressure command value for the input-clutch I/C has become 0 (zero) or not may be checked.

Also, in this embodiment, the input clutch I/C for the fifth gear position as the highest speed gear is temporally engaged in addition to the engagement of the forward brake Fwd/B when a shift operation to D range is performed. However, the engaging element to be temporally engaged is not limited to this, but an engaging element for a higher speed side gear position other than the forward brake Fwd/B which is engaged in the first gear position may be optionally selected.

Moreover, in this embodiment, an oil pressure command value for the input-clutch I/C is increased with a constant inclination immediately from a start point oil pressure value A, but the increase of the oil pressure command value may be started after the start point pressure value A is held for a predetermined period.

Although, the illustrated embodiment is applied to the automatic transmission achieving the five forward gear positions, but the number of gear positions is not limited to this and the individual names of the respective engaging elements are not limited to those of this embodiment.

What is claimed is:

1. A shift control system for an automatic transmission, which has select position detecting means for detecting a select position of a selector lever among a plurality of gear positions, including a first gear position, when the selector lever is located at a running range, comprising:
    control means for temporally engaging an engaging element to be engaged at a gear position of higher speed side than the first gear position when the select position detecting means detects that the selector lever is operated from a parking range or a neutral range to the running range;
    wherein said control means an oil pressure command value for actuating the engaging element to be engaged at the gear position of higher speed side at a predetermined precharge pressure value for a predetermined time, and then increases the oil pressure command value from a start point oil pressure value, which is lower than said predetermined precharge pressure value with a predetermine inclination, while changing the start point oil pressure value in accordance with driving condition.

2. A shift control system for an automatic transmission as claimed in claim 1, wherein the control means lowers the oil pressure command value immediately after the engaging element is engaged.

3. A shift control system for an automatic transmission as claimed in claim 2, further comprising:
    turbine speed detecting means connected to a torque converter and detecting a turbine revolution speed of the torque converter;
    wherein the control means determines that the engaging element is engaged when the turbine revolution speed is lower than a predetermined value.

4. A shift control system for an automatic transmission as claimed in claim 1, wherein the highest gear position is set as the gear position of higher speed side.

5. A shift control system for an automatic transmission, which has select position detecting means for detecting a select position of a selector lever among a plurality of gear positions, including a first gear position, when the selector lever is located at a running range, comprising:
    control means for temporally engaging an engaging element to be engaged at a gear position of higher speed side than the first gear position when the select position detecting means detects that the selector lever is operated from a parking range or a neutral range to the running range; and engine speed detecting means for detecting a revolution speed of an engine, wherein said control means increases an oil pressure command value for actuating the engaging element from a start point oil pressure value after reaching a precharge pressure with a predetermined inclination, while changing the start point oil pressure value in accordance with driving environments, and wherein the control means lowers the start point oil pressure value when the engine speed is lower than a predetermined value.

6. A shift control system for an automatic transmission as claimed in claim 5, further comprising:

oil temperature detecting means for detecting an oil temperature of the engaging element, wherein the control means lowers the start point oil pressure value as the oil temperature increases.

7. A shift control system for an automatic transmission as claimed in claim 5, wherein the control means lowers the oil pressure command value immediately after the engaging element is engaged.

8. A shift control system for an automatic transmission as claimed in claim 7, further comprising:

turbine speed detecting means connected to a torque converter and detecting a turbine revolution speed of the torque converter;

wherein the control means determines that the engaging element is engaged when the turbine revolution speed is lower than a predetermined value.

9. A shift control system for an automatic transmission as claimed in claim 5, wherein the highest gear position is set as the gear position of higher speed side.

10. A shift control system for an automatic transmission as claimed in claim 5, further comprising:

throttle valve opening detecting means for detecting an opening degree of a throttle valve of the engine, wherein the control means terminates a control to engage said engaging element to be engaged at the gear position of higher speed side when the throttle valve opening is larger than a predetermined value.

11. A shift control system for an automatic transmission, which has select position detecting means for detecting a select position of a selector lever among a plurality of gear positions, including a first gear position, when the selector lever is located at a running range, comprising:

control means for temporally engaging an engaging element to be engaged at a gear position of higher speed side than the first gear position when the select position detecting means detects that the selector lever is operated from a parking range or a neutral range to the running range; and oil temperature detecting means for detecting an oil temperature of the engaging element, wherein said control means increases an oil pressure command value for actuating the engaging element from a start point oil pressure value after reaching a precharge pressure with a predetermined inclination, while changing the start point oil pressure value in accordance with driving environments, and wherein the control means lowers the start point oil pressure value as the oil temperature increases.

12. A shift control system for an automatic transmission, which has select position detecting means for detecting a select position of a selector lever among a plurality of gear positions, including a first gear position, when the selector lever is located at a running range, comprising:

control means for temporally engaging an engaging element to be engaged at a gear position of higher speed side than the first gear position when the select position detecting means detects that the selector lever is operated from a parking range or a neutral range to the running range; and turbine speed detecting means connected to a torque converter and detecting a turbine revolution speed of the torque converter, wherein said control means increases an oil pressure command value for actuating the engaging element from a start point oil pressure value after reaching a precharge pressure with a predetermined inclination, while changing the start point oil pressure value in accordance with driving environments, wherein the control means lowers the oil pressure command value immediately after the engaging element is engaged, and wherein the control means determines that the engaging element is engaged when the turbine revolution speed is lower than a predetermined value.

13. A shift control system for an automatic transmission, which has select position detecting means for detecting a select position of a selector lever among a plurality of gear positions, including a first gear position, when the selector lever is located at a running range, comprising:

control means for temporally engaging an engaging element to be engaged at a gear position of higher speed side than the first gear position when the select position detecting means detects that the selector lever is operated from a parking range or a neutral range to the running range; and throttle valve opening detecting means for detecting an opening degree of a throttle valve of the engine, wherein said control means increases an oil pressure command value for actuating the engaging element from a start point oil pressure value after reaching a precharge pressure with a predetermined inclination, while changing the start point oil pressure value in accordance with driving environments, and wherein the control means terminates a control to engage said engaging element to be engaged at the gear position of higher speed side when the throttle valve opening is larger than a predetermined value.

* * * * *